US009652788B2

(12) United States Patent
King et al.

(10) Patent No.: US 9,652,788 B2
(45) Date of Patent: *May 16, 2017

(54) METHOD AND APPARATUS FOR LOGGING PRIVILEGE USE IN A DISTRIBUTED COMPUTING ENVIRONMENT

(75) Inventors: Nigel King, San Mateo, CA (US); George A. Buzsaki, Fremont, CA (US); Suchithra Upadhyayula, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1712 days.

This patent is subject to a terminal disclaimer.

(21) Appl. No.: 12/141,694

(22) Filed: Jun. 18, 2008

(65) Prior Publication Data

US 2009/0319527 A1 Dec. 24, 2009

(51) Int. Cl.
*G06F 7/00* (2006.01)
*G06Q 30/06* (2012.01)
(52) U.S. Cl.
CPC ..... *G06Q 30/06* (2013.01); *G06F 2221/2141* (2013.01)
(58) Field of Classification Search
CPC .............................................. G06F 2221/2141
USPC ................................ 707/774, 823, 765, 783
See application file for complete search history.

(56) References Cited

U.S. PATENT DOCUMENTS

| 5,586,312 | A  | * | 12/1996 | Johnson ................. G06F 9/466 |
| 5,692,124 | A  | * | 11/1997 | Holden ............... H04L 63/0823 |
|           |    |   |         | 707/999.009 |
| 5,884,312 | A  | * | 3/1999  | Dustan ................ H04L 63/0428 |
| 6,296,191 | B1 | * | 10/2001 | Hamann ............... G06Q 20/341 |
|           |    |   |         | 235/487 |
| 6,336,114 | B1 | * | 1/2002  | Garrison ............. G06F 21/6218 |
| 6,381,579 | B1 | * | 4/2002  | Gervais et al. .................... 705/8 |
| 6,553,377 | B1 | * | 4/2003  | Eschelbeck ............. G06F 21/50 |
| 6,694,436 | B1 | * | 2/2004  | Audebert ............... G06Q 20/04 |
|           |    |   |         | 707/999.202 |

(Continued)

*Primary Examiner* — Eliyah S Harper
(74) *Attorney, Agent, or Firm* — Shun Yao; Park, Vaughan, Fleming & Dowler LLP (57) ABSTRACT

One embodiment of the present invention provides a system that logs the use of privileges in a distributed computing environment. The distributed computing environment includes a database system, one or more client applications, and a unified security management layer between the database system and the one or more client applications. During operation, the system receives a request from a client application to execute a business function in the distributed computing environment. The system determines a privilege associated with the requested business function, and logs that the request is associated with the privilege. The system then checks, in the unified security management layer, whether a user associated with the request is associated with a role that has the privilege. If the user is associated with a role that has the privilege, the system performs the requested business function. By checking and logging privilege access in the unified security management layer, the system facilitates tracking privilege use for the database system and the client applications in a single entity, thereby enabling security managers to more easily audit privileged operations in the distributed computing environment.

21 Claims, 7 Drawing Sheets

(56) References Cited

U.S. PATENT DOCUMENTS

| | | | |
|---|---|---|---|
| 6,850,893 B2* | 2/2005 | Lipkin et al. | 705/7.11 |
| 6,934,706 B1* | 8/2005 | Mancuso et al. | |
| 7,058,978 B2* | 6/2006 | Feuerstein | G06F 21/55 705/26.35 |
| 7,263,717 B1* | 8/2007 | Boydstun | H04L 63/08 707/999.009 |
| 2002/0026592 A1* | 2/2002 | Gavrila | G06F 21/6218 726/6 |
| 2002/0178119 A1* | 11/2002 | Griffin | G06F 21/604 705/54 |
| 2003/0221124 A1* | 11/2003 | Curran et al. | 713/201 |
| 2003/0225765 A1* | 12/2003 | Frieden et al. | 707/9 |
| 2004/0162996 A1* | 8/2004 | Wallace | H04L 67/12 726/1 |
| 2007/0203881 A1* | 8/2007 | Schaad | G06F 21/629 |
| 2008/0010243 A1* | 1/2008 | Weissman | G06F 17/30424 |
| 2008/0033954 A1* | 2/2008 | Brooks | G06F 17/30613 |
| 2008/0077623 A1* | 3/2008 | Wood | G06F 17/30067 |
| 2009/0037379 A1* | 2/2009 | Bou-Diab | G06F 17/30938 |
| 2009/0183244 A1* | 7/2009 | Saraf | G06F 21/604 726/6 |
| 2011/0099030 A1* | 4/2011 | Besch | G06F 19/321 705/2 |

* cited by examiner

METHOD AND APPARATUS FOR LOGGING PRIVILEGE USE IN A DISTRIBUTED COMPUTING ENVIRONMENT

BACKGROUND

Field of the Invention

The present invention relates to techniques for tracking user access to resources and data in a distributed computing environment. More specifically, the present invention relates to a method and an apparatus for logging privilege use in a distributed computing environment.

Related Art

Many network-based applications are built upon a shared database system that provides a set of core data services. More specifically, these network-based applications typically store, access, and share information in the structured data storage provided by this shared database system.

Such shared database systems often provide a privileged access level that allows database administrators to create and maintain database structures to store data for application-level operations, but do not include any awareness of the meaning of the application-level operations associated with the stored data. For instance, while such a database system may log table-level operations triggered by applications in response to a user request, the database system typically has no knowledge about the application-level semantic meaning of the triggering operations. Hence, in a network-based application environment, understanding a user's actions, and ensuring that the user does not abuse access privileges, typically involves checking the logs of every application that the user has access to. For instance, when a person leaves a company on bad terms, a security manager who is checking the actions performed by the user in the last week of employment needs to individually check the logs of each application the user may have accessed to determine whether any malicious actions were performed. Searching through such distributed log data is both difficult and inconvenient, which makes obtaining an overall view of system security and a user's operations difficult to achieve.

Hence, what is needed is a method and an apparatus that facilitates auditing user behavior in a distributed computing environment without the above-described problems.

SUMMARY

One embodiment of the present invention provides a system that logs the use of privileges in a distributed computing environment. This distributed computing environment includes a database system, one or more client applications, and a unified security management layer between the database system and the one or more client applications. Moreover, users in the distributed computing environment are associated with one or more assigned roles, and in roles can be associated with one or more privileges. During operation, the system receives a request from a client application to execute a business function in the distributed computing environment. The system determines a privilege associated with the requested business function, and logs that the request is associated with the privilege. The system then checks, in the unified security management layer, whether a user who is associated with the request is associated with a role that has this privilege. If so, the system performs the requested business function. By checking and logging privilege access in the unified security management layer, the system facilitates tracking privilege use for the database system and the client applications in a single entity, thereby enabling security managers to more easily audit privileged operations in the distributed computing environment.

In some embodiments, the system defines and/or manages a set of business functions and privileges for the distributed computing environment in the unified security management layer. This set of business functions and privileges can be associated with a set of roles; a list of privileges; and a hierarchy for the set of roles. Checking privileges in the unified security management layer facilitates logging privilege use for semantically-rich business functions in a unified manner across the distributed computing environment, in contrast with managing and logging privileges separately for each individual client application.

In some embodiments, the system stores a set of information relating to users, roles, and/or privileges for the distributed computing environment in the database system. Moreover, the unified security management layer loads this set of information from the database system, and logs information for the request and the privilege in the database system.

In some embodiments, the database system also logs information for a second client application that directly accesses the database system without using the unified security management layer. Hence, the database system stores log information for all operations that involve privileged data, including both operations that access the database system directly as well as operations that access the database system via the unified security management layer.

In some embodiments, one or more client applications which are supplied by different software vendors can access the unified security management layer in a uniform manner, thereby allowing privilege use to be logged uniformly regardless of differences in user interfaces and implementations of client applications. Hence, the unified security management layer facilitates enforcing accountability for all users that access the distributed computing environment using participating client applications.

In some embodiments, the system tracks and/or displays logged privilege use data to a user (such as a security manager) via a user interface that facilitates enforcing accountability for privilege use over time.

In some embodiments, the system logs information associated with: the request; the attempted use of the privilege; the actual use of the privilege if the requested business function executes; and/or the outcome of the request.

In some embodiments, a role and its associated privileges can be granted to a user, a client application, and/or an executing section of program code.

In some embodiments, the system associates a given privilege managed by the unified security management layer with a set of menu items and/or pages in a given client application. For instance, the system can tailor a set of information and/or choices presented to a user in a given client application based on a given role and the given role's associated set of privileges.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Logging Issues in Distributed Computing Environments

Many network-based applications are built upon a shared database system that provides a set of core data services. More specifically, these network-based applications can store, access, and share information in the structured data storage provided by this shared database system. However, because each given application may layer distinct additional semantic information on top of the functionality provided by the database system, the task of efficiently determining a global snapshot of the actions that have taken place in the client applications can be difficult. For instance, the database system log may include some limited information tracking when a user logs on to perform a request, but does not provide any semantic information for the actions attempted and executed by a given user. Typically, only a given application is aware of the semantics of its own operations.

For instance, an application that stores data in the database system may define a concept of creating and/or approving a purchase order. While such purchase order data can be stored in the database system, the database system and other client applications do not have any explicit awareness of what a purchase order is because the notion of a purchase order is defined at a higher level, in the narrow context of the given application. Note that each application can define its own set of abstractions and/or operations, and determine how to store such data in the database system (e.g., in an application-specific manner). While analyzing the structures created by applications in the database system may reveal some aspects of user operations and application behavior, such analysis is often time-consuming and impractical. For instance, a given application may create a database table named "purchase orders" with "view access" for a given user, thereby giving a hint of the semantic use for the table and a set of privileges associated with the user. However, such hints are not guaranteed, and tracking the business meaning for a set of user operations across multiple applications in a distributed computing environment using such low-level information (e.g., from the perspective of the database system) can be tedious, challenging, and potentially impossible.

Note that each application in a given distributed computing environment may include its own logging infrastructure for tracing user actions and privileges. For instance, a given application can associate a mapping between a set of (user) privileges and the functions defined in the application, and record the functions invoked by a given user. For example, the application might create table describing: known users; application functions, menu items, and/or data items; and a mapping of application functions, menu items, and/or data items accessible by each user. While such techniques can manage privilege use at the application level, and can allow the application to check a given user's privileges to ensure that the user is allowed to access application pages, data, and/or functionality, the checks performed by such techniques are local to each given application, and may not be shared with the core database system. As a result, a security manager cannot easily obtain a high-level view of a user's operations in the distributed computing environment, but instead needs to check the logs of every application. For example, a security manager who wishes to trace what operations an employee has performed in the days before the employee left the company might need to run user audit reports within each application in an e-business application suite. Executing and collating the results of such application-specific audits can take considerable time in an environment with numerous applications.

One embodiment of the present invention facilitates auditing privilege use in a distributed computing environment by using a unified security management system (also referred to as a unified security management layer) between a database system and client applications. This unified security management layer updates a log whenever a client application requests to perform an operation that is sensitive enough to need a privilege, thereby facilitating centrally logging privilege use across participating applications and allowing security managers to more easily track a user's activities across many applications.

Centrally Logging Application-Level Privileges

In one embodiment of the present invention, a unified security management layer (USML) tracks and logs sensitive operations in a distributed computing environment. In this embodiment, users are associated with one or more assigned roles, wherein each role can be associated with one or more privileges, which restrict access to a function or data item (e.g., being granted a given privilege allows a user to access a function or data item associated with the privilege). The USML is aware of these roles and privileges, and can be used to both log and audit the use of these privileges by users and client applications. For instance, the USML can update a log whenever an application requests to perform an operation that is sensitive enough to need a privilege.

In one embodiment of the present invention, a map (or menu) of common functions is defined for an application environment. For instance, product managers may compile one or more menus and/or lists of representative business operations for an enterprise and upon which a list of roles, a list of privileges, and a hierarchy of roles are based. For example, a typical Fortune 500 business environment might involve a fairly static set of several hundred commonly recognizable job roles, where every job role may involve between four and ten duties, and each duty may involve five to ten privileges that are needed by a user to access the functionality and data needed to perform the duty. Note that in some embodiments the set of menus, functions, roles, privileges, and/or role hierarchy may be dynamically extensible by customers, application partners, and/or other parties.

Figure 1:
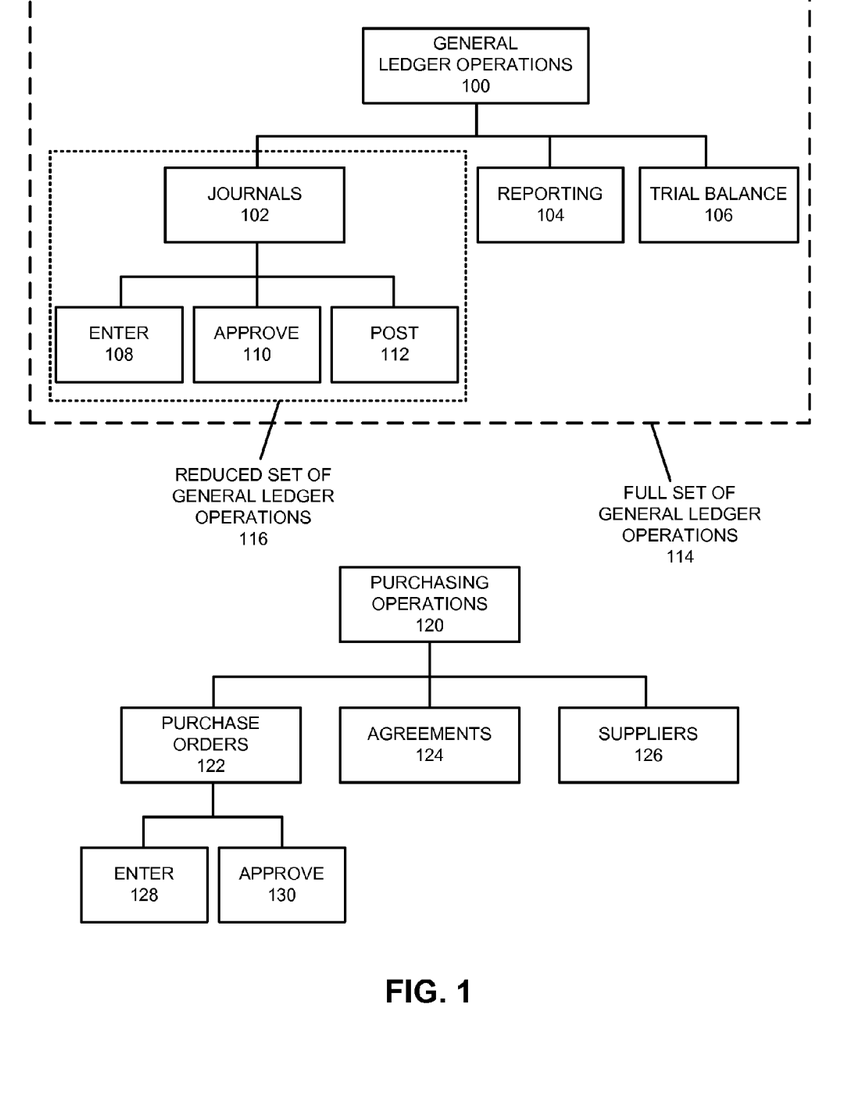
FIG. 1 illustrates exemplary menu hierarchies for a set of general ledger and purchasing operations in accordance with an embodiment of the present invention.

FIG. 1 illustrates exemplary menu hierarchies for a set of general ledger operations 100 and purchasing operations 120. Sub-menus for general ledger operations 100 include menu items for journals 102, reporting 104, and trial balance 106. The journals menu item 102 includes an additional set of menu items (and associated privileges) that differentiate the ability to enter 108, approve 110, and/or post 112 to journals. Sub-menus for purchasing operations 120 include menu items for purchase orders 122, agreements 124, and suppliers 126. The purchase order menu item 122 includes an additional set of menu items (and privileges) that differentiate the ability to enter 128 and/or approve 130 purchase orders. Users and/or roles may be associated with a set of menu items, with the set of menu items specifying the set of privileges that have been granted to the user. For instance, the role of a general ledger clerk may be granted access to the full set of general ledger operations 114 (and all of their associated privileges). In contrast, a junior general ledger clerk may only be granted access to a reduced set of general ledger operations 116 and privileges. Similarly, a purchasing manager may be granted access to all of the items in the purchasing operations hierarchy (items 120-130), while a buyer may only be given access to the purchase orders sub-hierarchy (items 122, 128, and 130). Individual users may also be given additional access rights to menu items on a per-user basis.

Note that in some embodiments the system uses a single, integrated master menu that includes all of the menu items. Alternatively, other embodiments may use multiple hierarchies of such menu items (as shown in FIG. 1). Note also that the menu items may correspond to actual menus presented to users in one or more applications, where the system only presents to a user (and/or enables the choice of) menus for which the user has been granted a privilege. Such menu items (and menus) may be individually activated on a per-user and/or per-role basis.

Figure 2:
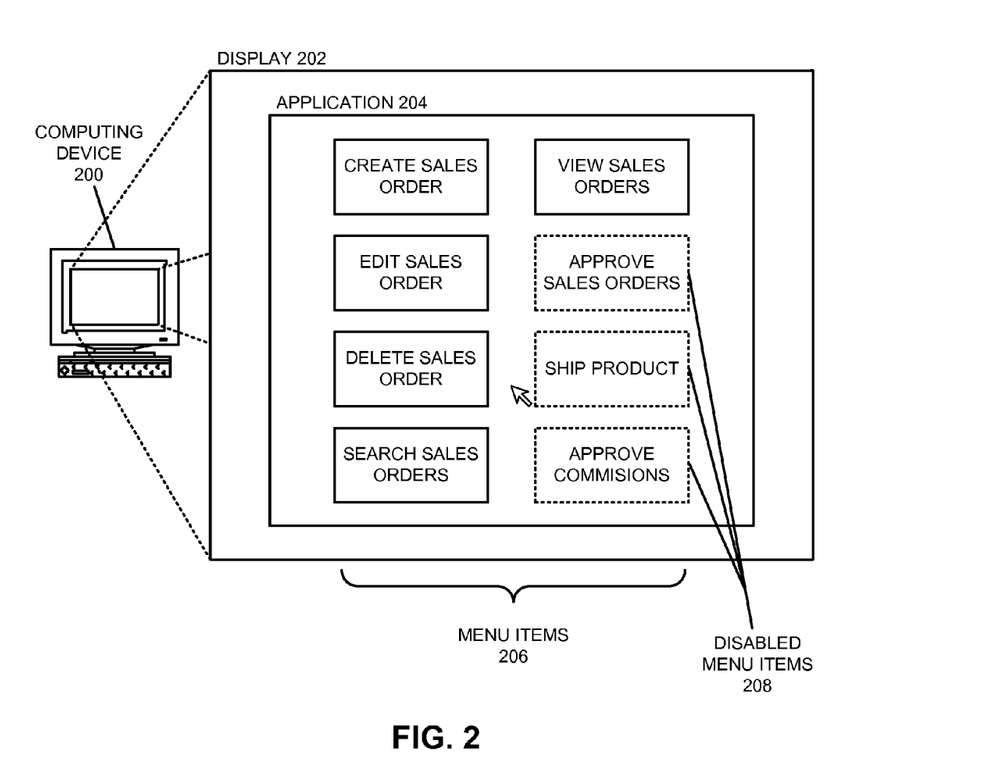
FIG. 2 illustrates an exemplary set of menus displayed to a user in accordance with an embodiment of the present invention.

FIG. 2 illustrates an exemplary set of menus displayed to a user in display 202 of computing device 200. Application window 204 includes a set of menu items 206 for business operations available to an order management user, such as operations for: creating a sales order; editing a sales order; deleting a sales order; searching through sales orders; and/or viewing sales orders. Also illustrated are a set of disabled menu items 208 for which the role of order management user does not have privileges (or may not have privileges for yet). These disabled menu items 208 may, however, be available to a more privileged role of an order desk supervisor.

Figure 3:
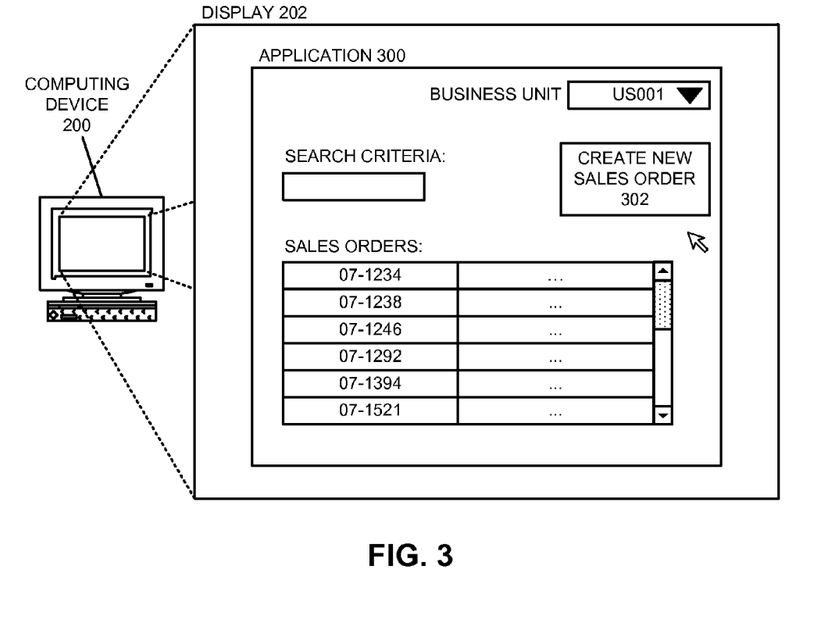
FIG. 3 illustrates an additional exemplary application window that a user may encounter when entering or managing sales orders in accordance with an embodiment of the present invention.

FIG. 3 illustrates an additional exemplary application window 300 that a user may encounter when entering or managing sales orders. Before displaying application window 300, the system first checks to ensure that the given user has been granted the privileges needed to see the information to be displayed. For instance, when a user who has the role of an order management user selects a business unit "US001," the system may log and check the use of a privilege "manage sales order" for the specified business unit, and then proceed to display the requested information. If the user subsequently selects the "create new sales order" item 302, the system may log and check the use of a privilege "create order" before allowing the user to actually create the new sales order.

In one embodiment of the present invention, the system includes a logging infrastructure that logs the checking of a privilege, thereby providing the ability to trace the functions used by an application during a user session. Note that the system updates one or more logs whenever an application that adopts the security model is requested to perform an operation that is sensitive enough to require the use of a privilege. Note that such logging occurs at a lower level than client applications (e.g., closer to the database system) in an additional layer that can express business semantics in a way that the database system cannot. The semantic awareness of business operations is hence pushed from the client applications into a shared unified security management layer.

Figure 4:
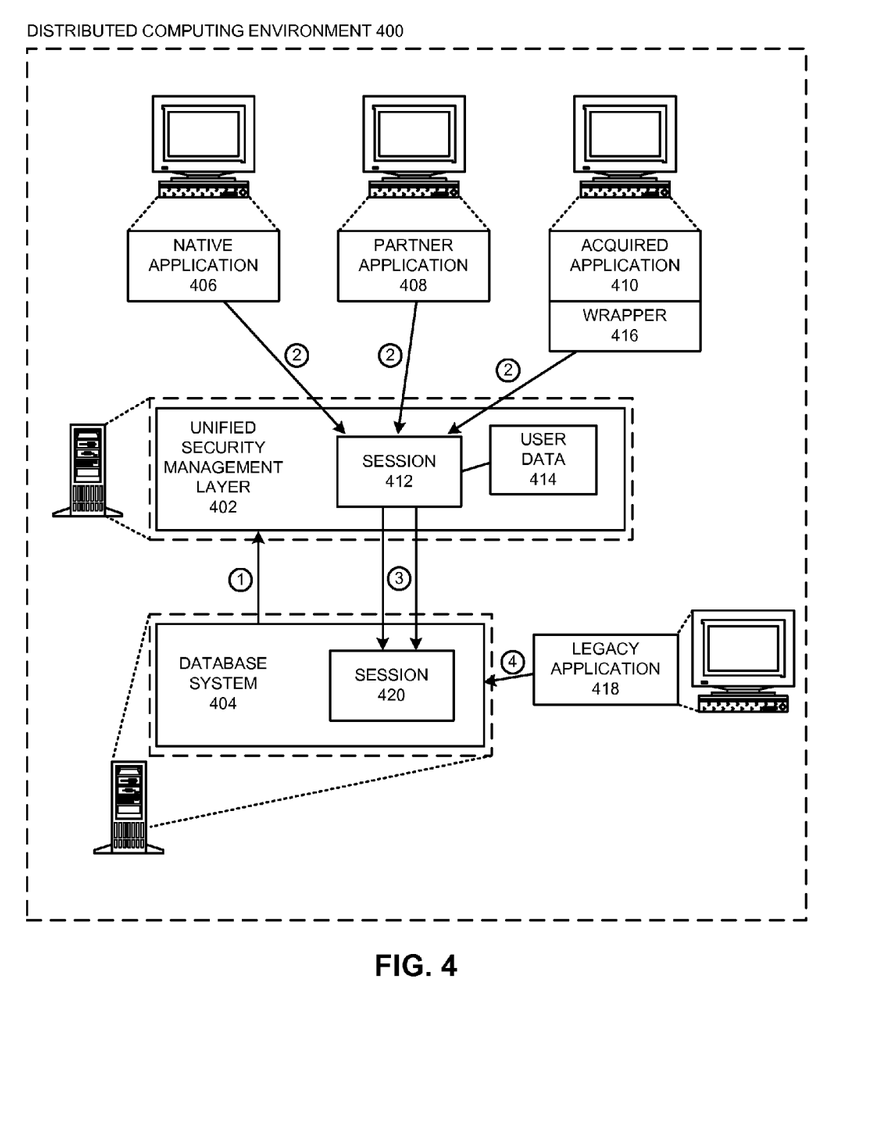
FIG. 4 illustrates a distributed computing environment that includes a unified security management layer in accordance with an embodiment of the present invention.

FIG. 4 illustrates a distributed computing environment 400 that includes a unified security management layer (USML) 402 that provides additional functionality between a set of client applications (items 406-410) and a database system 404. As described above, USML 402 includes additional knowledge of business operations and privileges (above and beyond what is stored in database system 404).

Note that USML 402 may use database system 404 to store and access user, role, and privilege data stored in database system 404. For instance, when USML 402 detects a user attempting to perform a privileged operation (e.g., via native application 406), USML 402 may load data associated with the user and the user's roles and privileges from database system 404 storage (operation 1). USML 402 may also maintain session data 412 for a given application operation (or a multi-application operation, such as a task workflow) for the extent of the operation (or indefinitely), along with a cache of user data 414.

During operation, USML 402 receives requests from client applications (e.g., items 406-410) to execute business functions (operation 2). Next, USML 402 determines one or more privileges associated with each business function, and logs the attempted privilege use (whether successful or not). For instance, USML 402 may log the attempted privilege use into a structured set of data tables for the session 420 in database system 404 (operation 3). USML 402 then checks whether the user associated with the request has been granted the needed privileges and/or roles, and, if so, attempts to execute the requested business function (for instance, by forwarding the request to database system 404). Database system 404 may perform additional checks before executing associated queries and returning a response to USML 402 and the client applications.

Note that using USML 402 may involve changing client applications to understand the shared business semantics of USML 402 and to check privileges within USML 402 instead of within the client applications. Some applications, such as native application 406, may be implemented by the same organization as USML 402, and may hence integrate natively with the described technology. Other vendors may implement partner applications 408 to use the same application programmer interface (API), and thereby may also provide functionality and logging which is substantially similar to what is provided by native application 406. However, some existing applications may not be able to make immediate use of the additional functionality of USML 402. For instance, application developers may need some time to enhance an acquired product line with the functionality needed to access USML 402. Hence, supporting some applications (such as acquired application 410) in distributed computing environment 400 may involve additional infrastructure, such as a wrapper 416 that converts requests and outputs from acquired application 410 into a format recognized by USML 402. Note that such applications may access only a limited subset of the functionality of USML 402, for instance checking and/or logging only a limited subset of business operations.

Also note that while applications 406-410, USML 402, and database system 404 are illustrated in FIG. 4 as executing on different computing devices, one or more components of the system may be on a single computing device or a reduced set of computing devices. For instance, USML 402 and database system 404 may execute on a single server, and applications 406-410 may execute on a single computing device.

In one embodiment of the present invention, managing privileges in the unified security management layer facilitates logging and auditing privileges for semantically-rich business functions in a unified manner across the distributed computing environment instead of managing privileges separately in individual client applications. By incorporating a unified security management layer that is aware of business semantics and operations, the system facilitates using a unified set of privileges for the distributed computing environment, and enables privileges associated with business operations to be monitored centrally for the distributed computing environment. The unified security management layer also provides a level of abstraction between the client applications and the tables in the database system that are used to manage and log privileges for business operations.

Note that the system may allow some legacy applications that do not support the unified security management layer to access the database system directly, if needed (as illustrated for legacy application 418 in FIG. 4). For instance, a legacy application that follows the previous model of managing its own privileges internally may communicate directly with the database system (e.g., operation 4 in FIG. 4, which may involve legacy application 418 sending an SQL command to database system 404), in which case the database system provides a more-basic level of protection and logging that does not consider or log business operation semantics. In some embodiments the system may restrict such access modes to trusted legacy applications, and may force all other applications to access the database system via the unified security management layer. Note that legacy application 418 may continue to log its privileged actions to the database system 404, but in a format which is not understood by the database system 404 or monitored by USML 402. Hence, the database system still centrally logs as much data as possible for all of the privileged operations made by applications in the system (e.g., by storing the data logged by client applications that adopt the USML security model and, in the worst case, storing the more limited log data available from applications directly accessing the database). While some of this data (from USML-enhanced operations) can be browsed semantically by security managers, some lower-level data may require more detailed analysis.

Figure 5:
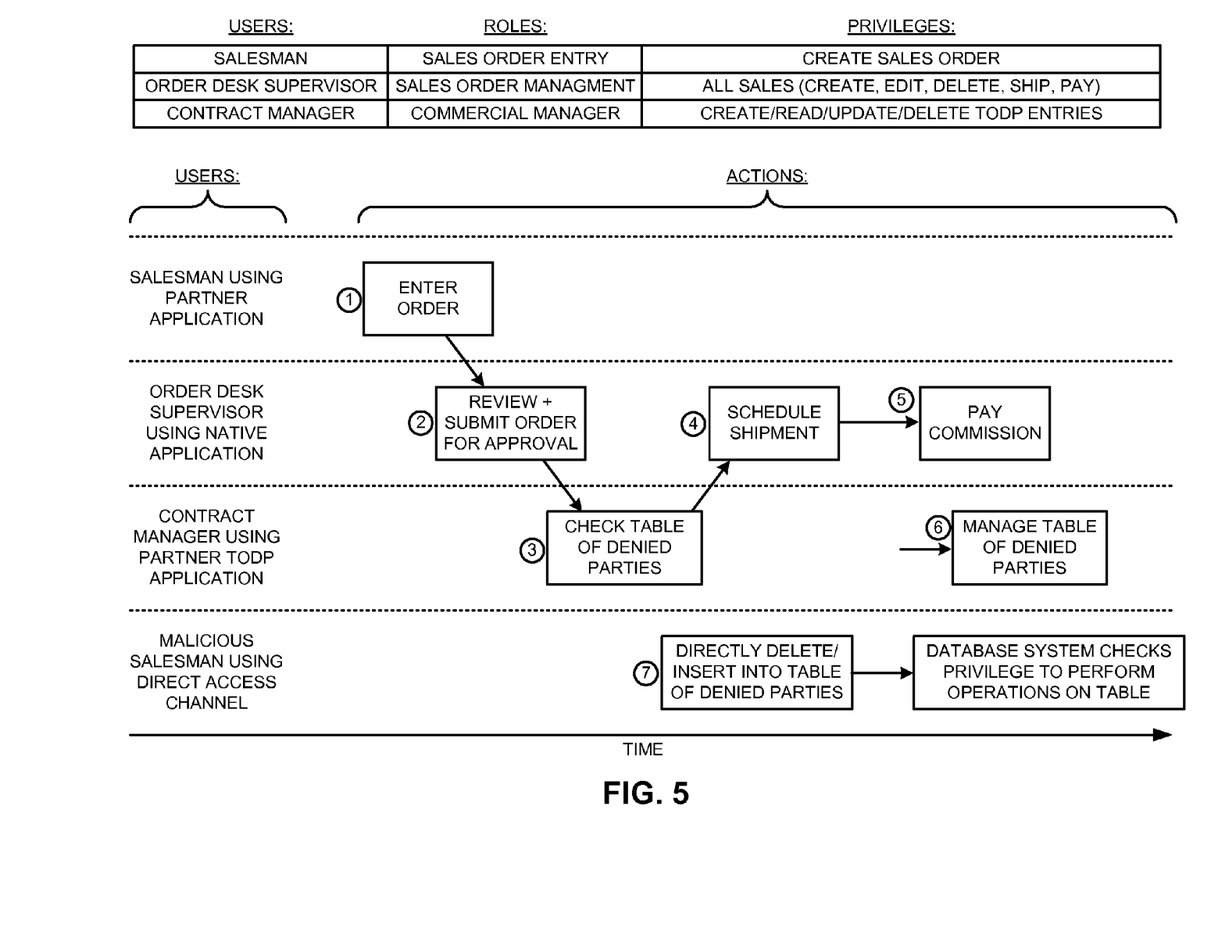
FIG. 5 illustrates an exemplary sequence of privileged operations in a distributed computing environment in accordance with an embodiment of the present invention.

FIG. 5 illustrates an exemplary sequence of privileged operations in a distributed computing environment. This example involves:

- a salesman with a sales order entry role, who has been granted the privilege to create sales orders;
- an order desk supervisor with a sales order management role which includes privileges to perform any sales operation, including creating a sales order, approving a sales order, triggering a product shipment, and paying a commission for a successfully completed sales order;
- a contract manager that serves in the role of a commercial manager who manages a table of denied parties (TODP) that specifies entities that are not allowed to receive specified technologies, where the contract manager has been granted privileges to access and modify entries in the TODP; and
- a malicious salesman without privileges who tries to access the table of denied parties directly.

During operation, a salesman enters a sales order using a partner application (operation 1). The partner application does not check the validity of this sales order, but instead directly sends a request to the USML to create this order, at which point the USML determines that this business operation requires the "create sales order" privilege, and logs the attempted use of the privilege. The USML then checks to confirm that the salesman has indeed been granted this privilege (e.g., by loading and performing checks on a set of data associated with the user and the role from the database system). After determining that the sales order entry role associated with the salesman does indeed have this privilege, the USML submits the sales order to the database system, at which point the sales order is forwarded to an order desk supervisor for approval. The system then: (1) detects and logs the order desk supervisor's attempt to open the sales order for review in a native application (operation 2); (2) confirms that the order desk supervisor's sales order management role includes the required privileges; and (3) allows the order desk supervisor's request to submit the sales order to a contract manager for checking. Before a given product listed in the sales order can be shipped, a contract manager needs to ensure that the sales order does not involve any parties listed in a table of denied parties (TODP) (operation 3) (e.g., to confirm that products that include sensitive technologies are not shipped to countries deemed to be a threat). The system logs the attempt to access the TODP, checks the contract manager's role and associated privileges to ensure that the user has authority to access the TODP, and (in this case, due to the privileges associated with the contract manager) allows the sales order to be approved. At this point the order desk supervisor attempts to schedule shipment of the product and pay the commission of the salesman (operations 4 and 5), and both business operations are first logged and then executed (due to the privileges associated with the sales order management role).

Note that only the contract manager is associated with the privileges needed to manage the TODP (operation 6). Hence, an attempt by a malicious salesman to delete an entry in the TODP using a partner application (e.g., to allow an unauthorized product sale) results in the system logging the salesman's attempt to access a TODP-related privilege and denying the operation (due to the salesman being associated with only the privileges of the sales order entry role). A malicious salesman might also seek to modify data related to the TODP directly in the database system using a direct channel to the database system (operation 7). Because the database system does not have semantic awareness of the requested operation and its associated privileges, such an attempt might rely upon more basic protection mechanisms in the database system, such as table-level and/or per-user protections, to prevent such an unauthorized direct access. For instance, system designers may specify that certain categories of sensitive data in the database system are only accessible via the USML.

Figure 6:
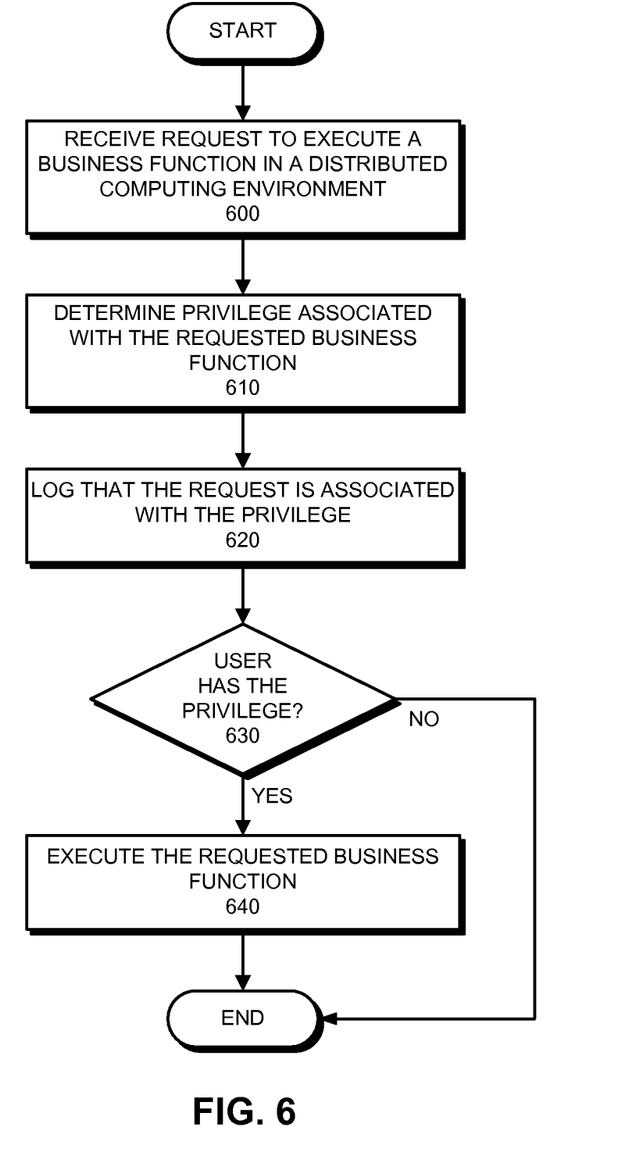
FIG. 6 presents a flowchart illustrating the process of logging privilege use in a distributed computing environment in accordance with an embodiment of the present invention.

FIG. 6 presents a flowchart illustrating the process of logging privilege use in a distributed computing environment. As described previously, the distributed computing environment includes a database system, one or more client applications, and a unified security management layer between the database system and the client applications. Moreover, users in the distributed computing environment are associated with one or more assigned roles that are in turn associated with privileges to execute specified business operations. During operation, the system receives a request from a client application to execute a business function in the distributed computing environment (operation 600). Next, the system determines a privilege associated with the requested business function (e.g., in the client application and/or unified security management layer) (operation 610), and logs that the request is associated with the determined privilege (operation 620). For instance, the system may log: the nature of the request; the user making the request; the roles and/or privileges associated with the user; the timeframe in which the request was made; parameters associated with the request; and/or other relevant information. The system then checks in the unified security management layer whether the user submitting the request is associated with a role that allows access to the privilege (operation 630), and, if so, executes the requested business function (operation 640). By checking and logging privilege access in the unified security management layer, the system facilitates tracking privilege use for the database system and the client applications in a single entity, thereby enabling security managers to more easily check and collate privileged operations in the distributed computing environment.

Note that, in some embodiments of the present invention, the attempted use of a privilege is logged before the business operation is actually performed, thereby ensuring that the system logs both successful and unsuccessful operations. The system may also log the actual use of the privilege if the requested business function executes, as well as the outcome of the request.

Note that the system can track the privileges needed to access both a given application page in a client application as well as the items on that application page. While this information previously was primarily determined and enforced in the client application, such determinations can now be made via the USML and underlying database system. For instance, after determining the business function associated with a selected button or tab in an application page, the client application can query the USML to determine whether the user has a privilege associated with the selected business function before proceeding. In the case of an error in the client application that mismatches a privilege associated with a requested set of data, the USML and the database system can serve as gatekeepers that ensure that the data returned (or the corresponding lower-level operations which are triggered) do not exceed the privileges held by the user. The system may note and log such erroneous privilege uses for debugging purposes. Hence, the USML serves both as a shared layer that tracks high-level business concepts as well as a gatekeeper that works with the database system to ensure that system security policies are not violated.

In one embodiment of the present invention, the system provides security managers with a uniform way to check the privilege use of multiple applications, thereby allowing security managers to efficiently audit users' activities. Recall that users are assigned roles (and roles are associated with privileges) that are tracked on a system-wide basis. While screens and functionality in each client application are application- and/or vendor-specific, the client applications share a common underlying privilege model that is independent of the client implementation (e.g., client applications use the same privilege to access a business function whether they are implemented as a web-based user interface, spreadsheet user interface, or standalone program). Hence, security managers can record and check the user of privileges in an application- and vendor-independent manner. Note, however, that the described system does not benefit only security managers. For instance, an order administrator role may be granted privileges that facilitate managing orders across all of the client applications in the entire system. While previously such a role would need to be configured in each individual client application, integrating privilege use into the unified security management layer allows this role to be defined in one place for all of the client applications. From the application viewpoint, this privilege definition occurs at the level of the database, and no longer needs to be managed by the client applications individually.

In one embodiment of the present invention, the system includes a user interface that can be used by a security manager to monitor the attempted use of privileges. For instance, this user interface may facilitate displaying and/or tracking attempted privilege use for one or more users, roles, privileges, computing devices, and/or applications over time. A security manager can use such a user interface to determine the set of privileges accessed by a given user over a given time period, and thereby determine whether unauthorized access attempts have occurred and/or the system may have been compromised by an application error. The security manager may also use the user interface to determine a set of privileges granted but not used (and hence perhaps not needed) by a given user, in which case such unneeded privileges may be removed for that user (under the least privilege principle).

Figure 7:
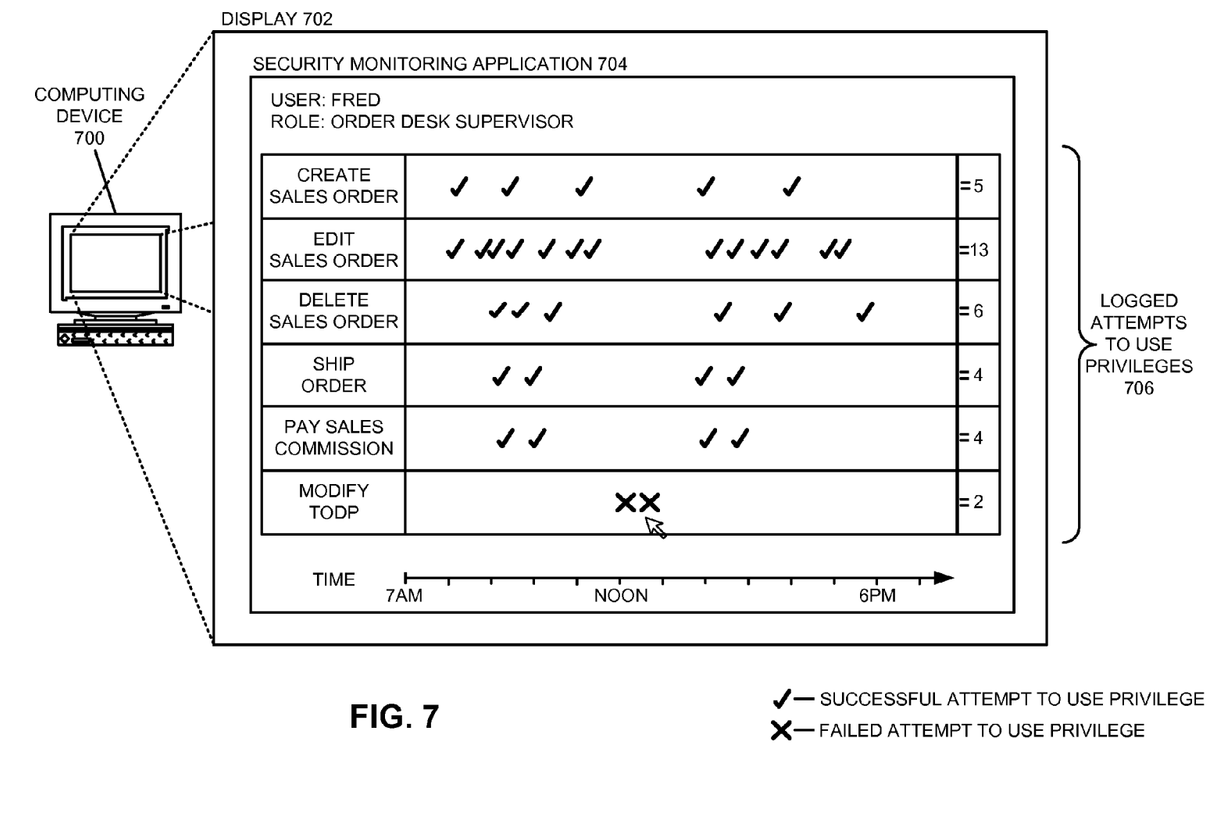
FIG. 7 illustrates an exemplary security monitoring application in accordance with an embodiment of the present invention.

FIG. 7 illustrates an exemplary security monitoring application 704 presented in display 702 of computing device 700, where security monitoring application 704 displays attempted privilege use for a given user over a time period (such as a specific day) to a security manager. Security monitoring application 704 displays to a security manager a set of attempts made by a user ("Fred"), who has a role of an order desk supervisor (which is associated with a set of privileges as shown in FIG. 5), to use privileges. In this example, security monitoring application 704 displays logged attempts to use privileges 706. These logged attempts include a set of successful attempts to use privileges that are associated with the user's role, that relate to: creating, editing, and deleting sales orders; authorizing the shipping of orders; and authorizing the payment of sales commissions for the shipped orders. However, the logged attempts to use privileges 706 also pinpoint several failed attempts to access a privilege (to modify a table of denied parties) that is not granted to the role of order desk supervisor. A security manager monitoring privilege use via the user interface may detect and further investigate such failed attempts. Note that security monitoring application 704 may include different views that display attempts to use privileges based on users, roles, privileges, applications, computing devices, and/or applications. For instance, a security manager may choose to display the frequency and sum (as displayed in the right column of security monitoring application 704 in FIG. 7) of privilege usage for a given user, or aggregated by role, over a given time period to monitor for suspicious behavior.

In one embodiment of the present invention, a role and/or privileges can be granted to a user, a client application, and/or an executing section of program code, and a given application session may acquire and relinquish roles and/or privileges as a user executes business functions. For instance, an assemble-to-order factory may need to update project data to indicate that a given order is currently being processed. For security reasons, it may be undesirable for the role of factory manager to be granted access to the project system, so developers may instead allow trusted scheduling code to temporarily be granted the necessary privilege to update schedule information in the project system. For instance, the system may temporarily or permanently grant a role (with the associated privileges) to the application containing the scheduling program code, instead of a person (such as the factory manager). In this way, the person can use the client application to enter progress and scheduling information into the project system without being granted a related set of privileges. In this case, the person is limited to performing a small set of operations with the privilege that are bounded by the limitations of the client application, as opposed to having the full range of access allowed by having the person be directly associated with the privilege.

In summary, in existing systems unaware of application-level business semantics, all semantic knowledge is managed at the level of the client applications. Moreover, each client application uses the database system directly store structured data, and the database has no semantic knowledge for this stored data. In contrast, in one embodiment of the present invention, a unified security management layer provides shared functionality that tracks and manages explicitly-defined high-level business concepts (e.g., approving sales orders, reviewing account balances, and other application-level abstractions) that cannot be described in the database system directly. This layer provides a central, uniform mechanism that can log privilege usage for a range of client applications. The actions of these client applications can be logged and coordinated through the USML, which records privilege use in the database system. Hence, this system provides a general security management infrastructure that allows security managers to more efficiently audit privilege use for an entire enterprise from a single point. This facilitates enforcing accountability across applications and database operations, with all operations that require privileges, including complex business operations understood by client applications as well as lower-level operations understood purely by the database system, being logged in a common infrastructure.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for logging the use of privileges in a distributed computing environment, the method comprising:
   receiving, by a security management system residing between a database system and a client application, a request from the client application to perform a business function, wherein the security management system is separate from the client application and the database system;
   determining, by the security management system, a privilege associated with the requested business function based on application-level business semantics of the requested business function and an application-independent privilege model, wherein the security management system tracks application-level business semantics of business functions for a plurality of client applications and an application-level business semantics of a respective business function is separately defined by a respective application of the plurality of applications;
   generating, by the security management system, a log entry that includes the privilege and the requested business function, wherein generating the log entry involves recording the application-level business semantics that include application-specific descriptions of the requested business function;
   determining whether the client application associated with the request has the privilege associated with the requested business function, which involves determining a role associated with the privilege granted to the client application; and
   executing the requested business function responsive to the client application having the privilege.

2. The method of claim 1,
   wherein the requested business function and privilege are associated with a role; and
   wherein generating the log entry that includes the privilege and the requested business function facilitates logging privilege use for semantically-rich business functions in a unified manner across the distributed computing environment instead of managing privileges separately in individual client applications.

3. The method of claim 1,
   wherein a set of information relating to users, roles and/or privileges for the distributed computing environment is stored in the database system;
   wherein the method further comprises loading the set of information relating to users, roles, and/or privileges from the database system into the security management system; and
   wherein the log entry that includes the privilege and the corresponding requested business function is stored in the database system.

4. The method of claim 1, further comprising logging, by the database system, information for a second client application that directly accesses the database system without using the security management system; and
   wherein information is logged in the database system for all operations using privileged data, whether the operations directly access the database system or access the database system via the security management system.

5. The method of claim 1, further comprising receiving access requests, by the security management system, from a plurality of client applications associated with different vendors;
   wherein privilege use is logged uniformly regardless of the user interfaces and implementations of the client applications; and
   wherein the security management system facilitates enforcing accountability for the plurality of client applications in the distributed computing environment.

6. The method of claim 1, further comprising displaying logged privilege use data.

7. The method of claim 1, further comprising logging information associated with the request, attempted use of the privilege if the request is denied, actual use of the privilege if the requested business function executes, and/or the outcome of the request.

8. The method of claim 1, wherein a role and its associated privileges are granted to a user, a client application, and/or an executing section of program code.

9. The method of claim 1,
   wherein a set of menu items and pages in a given client application are associated with a given privilege managed by the security management system; and
   wherein a set of information and/or choices presented to the user in the given client application is tailored to a given role and the given role's associated set of privileges.

10. A non-transitory computer-readable storage medium storing instructions that when executed by a computer cause the computer to perform a method for logging the use of privileges in a distributed computing environment, the method comprising:
   receiving, by a security management system residing between a database system and a client application, a request from the client application to perform a business function, wherein the security management system is separate from the client application and the database system;
   determining, by the security management system, a privilege associated with the requested business function based on application-level business semantics of the requested business function and an application-independent privilege model, wherein the security management system tracks application-level business semantics of business functions for a plurality of client applications and an application-level business semantics of a respective business function is separately defined by a respective application of the plurality of applications;
   generating, by the security management system, a log entry that include the privilege and the requested business function, wherein generating the log entry involves recording the application-level business semantics that include application-specific descriptions of the requested business function;
   determining whether the client application associated with the request has the privilege associated with the requested business function, which involves determining a role associated with the privilege granted to the client application; and
   executing the requested business function responsive to the client application having the privilege.

11. The computer-readable storage medium of claim 10, wherein the requested business function and privilege are associated with a role; and
   wherein generating the log entry that includes the privilege and the requested business function facilitates logging privilege use for semantically-rich business functions in a unified manner across the distributed computing environment instead of managing privileges separately in individual client applications.

12. The computer-readable storage medium of claim 10,
   wherein a set of information relating to users, roles and/or privileges for the distributed computing environment is stored in the database system;
   wherein the method further comprises loading the set of information relating to users, roles, and/or privileges from the database system into the security management system; and
   wherein the log entry that includes the privilege and the corresponding requested business function is stored in the database system.

13. The computer-readable storage medium of claim 10,
   wherein the method further comprises logging, by the database system, information for a second client application that directly accesses the database system without using the security management system; and
   wherein information for all operations using privileged data is logged in the database system, whether the operations directly access the database system or access the database system via the security management system.

14. The computer-readable storage medium of claim 10,
   wherein the method further comprises receiving access requests, by the security management system, from a plurality of client applications associated with different vendors;
   wherein privilege use is logged uniformly regardless of the user interfaces and implementations of the client applications; and
   wherein the security management system facilitates enforcing accountability for the plurality of client applications in the distributed computing environment.

15. The computer-readable storage medium of claim 10, wherein the method further comprises logging information associated with the request, attempted use of the privilege if the request is denied, actual use of the privilege if the requested business function executes, and/or the outcome of the request.

16. The computer-readable storage medium of claim 10, wherein a role and its associated privileges are granted to an executing section of program code.

17. The computer-readable storage medium of claim 10,
   wherein a set of menu items and pages in a given client application are associated with a given privilege managed by the security management system; and
   wherein a set of information and/or choices presented to the user in the given client application is tailored to a given role and the given role's associated set of privileges.

18. A security management system for logging privilege use in a distributed computing environment, comprising:
   a processor;
   a receiving mechanism configured to receive a request from a client application to perform a business function, wherein the security management system is separate from the client application and the database system, and wherein the security management system resides between the client application and the database system;
   a determining mechanism configured to determine a privilege associated with the requested business function based on application-level business semantics of the requested business function and an application-independent privilege model, wherein the security management system tracks application-level business semantics of business functions for a plurality of client applications and an application-level business semantics of a respective business function is separately defined by a respective application of the plurality of applications;

a logging mechanism configured to generate a log entry that includes the privilege and the requested business function, wherein while generating the log entry, the logging mechanism is configured to record the application-level business semantics that include application-specific descriptions of the requested business function;

a checking mechanism configured to determine whether the client application associated with the request has the privilege associated with the requested business function, which involves determining a role associated with the privilege granted to the client application; and an executing mechanism configured to execute the requested business function responsive to the client application having the privilege.

19. The security management system of claim claim 18, wherein the requested business function and privilege are associated with a role; and wherein generating the log entry that includes the privilege and the requested business function facilitates logging privilege use for semantically-rich business functions in a unified manner across the distributed computing environment instead of managing privileges separately in individual client applications.

20. The security management system of claim 18, wherein a set of information relating to users, roles and/or privileges for the distributed computing environment is stored in the database system;

wherein the security management system further comprises a loading system configured to load the set of information relating to users, roles, and/or privileges from the database system into the security management system; and wherein the log entry that includes the privilege and the corresponding requested business function is stored in the database system.

21. The method of claim 1, further comprising maintaining, by the security management system residing between the database system and the client application, session data for an application operation.

* * * * *

UNITED STATES PATENT AND TRADEMARK OFFICE
CERTIFICATE OF CORRECTION

| | | |
|---|---|---|
| PATENT NO. | : 9,652,788 B2 | Page 1 of 1 |
| APPLICATION NO. | : 12/141694 | |
| DATED | : May 16, 2017 | |
| INVENTOR(S) | : King et al. | |

It is certified that error appears in the above-identified patent and that said Letters Patent is hereby corrected as shown below:

In the Drawings

On sheet 5 of 7, in FIG. 5, Line 3, delete "MANAGMENT" and insert -- MANAGEMENT --, therefor.

In the Claims

In Column 16, Line 1, in Claim 19, delete "claim claim" and insert -- claim --, therefor.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*